US011194765B2

(12) United States Patent
Vajravel et al.

(10) Patent No.: US 11,194,765 B2
(45) Date of Patent: Dec. 7, 2021

(54) ACCELERATING AND ATOMICALLY MOVING FILES IN AN OVERLAY OPTIMIZER

(71) Applicant: Dell Products L.P., Round Rock, TX (US)

(72) Inventors: Gokul Thiruchengode Vajravel, Rayasandra Bengaluru (IN); Ankit Kumar, Deoghar (IN); Puneet Kaushik, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 595 days.

(21) Appl. No.: 16/057,698

(22) Filed: Aug. 7, 2018

(65) Prior Publication Data

US 2020/0050684 A1    Feb. 13, 2020

(51) Int. Cl.
*G06F 16/172* (2019.01)
*G06F 16/17* (2019.01)

(52) U.S. Cl.
CPC ........ *G06F 16/172* (2019.01); *G06F 16/1734* (2019.01)

(58) Field of Classification Search
CPC ................ G06F 16/172; G06F 16/1734
See application file for complete search history.

(56) References Cited

U.S. PATENT DOCUMENTS

| 2003/0009480 | A1* | 1/2003 | Lin ........................ G06F 16/16 |
| 2007/0101079 | A1* | 5/2007 | Macintyre ........... G06F 12/1416 |
| | | | 711/163 |
| 2007/0186070 | A1* | 8/2007 | Federa ................ G06F 12/1425 |
| | | | 711/163 |
| 2018/0217940 | A1* | 8/2018 | Joshi ...................... G06F 21/78 |
| 2018/0225058 | A1* | 8/2018 | Kaushik ................ G06F 3/0617 |

* cited by examiner

*Primary Examiner* — Jensen Hu
(74) *Attorney, Agent, or Firm* — Kirton McConkie; Brian Tucker

(57) ABSTRACT

An overlay optimizer can be configured to accelerate the moving of files from an overlay and to atomically move files from the overlay. To accelerate the moving of files from the overlay, the overlay optimizer can continuously monitor the consumption of the overlay. If the consumption exceeds an optimized threshold, the overlay optimizer can cause the file system cache to be invalidated to thereby release handles to any closed files that are still cached. To move files atomically from the overlay, the overlay optimizer can be configured to handle attempts to open a file by determining whether the file is in the process of being moved from the overlay. If so, the overlay optimizer can detect which stage the move process has reached and can dynamically adapt the move process to enable the attempt to open the file to be completed successfully and in a consistent manner.

13 Claims, 8 Drawing Sheets

ACCELERATING AND ATOMICALLY MOVING FILES IN AN OVERLAY OPTIMIZER

CROSS-REFERENCE TO RELATED APPLICATIONS

N/A

BACKGROUND

The Windows Embedded and Windows operating systems include functionality that can prevent the content of a storage medium from being changed. In a typical example, it may be desirable to prevent the operating system image, which may be stored on a particular disk partition or on flash media, from being changed at runtime. To accomplish this, Windows provides a file-based write filter which operates at the file level and a block-based write filter (or enhanced write filter) that operates at the block level to redirect all writes that target a protected volume to a RAM or disk cache called an overlay. This overlay stores changes made to the operating system at runtime but is removed when the device is restarted thereby restoring the device to its original state.

FIG. 1 illustrates how a write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, write filter 110 is positioned at the top of the driver stack and will therefore be able to process an IRP prior to the IRP being passed down to the lower level drivers. Write filter 110 can be configured to detect writes targeting a protected volume and redirect them to overlay 140 rather than allowing them to be passed down the driver stack unchanged. As a result, the write will actually occur in overlay 140 rather than to disk 100. Write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

The size of the overlay employed by the Windows write filter is static and cannot be changed without rebooting. For example, the UWF_OverlayConfig.SetMaximumSize function allows the size of the overlay, in megabytes, to be specified. However, when this function is called, it has no effect on the size of the overlay during the current session. Instead, the specified size of the overlay will not be applied until the next session.

One problem that results from the static size of the overlay is that the system will be automatically rebooted if the overlay becomes full. The user will not be presented with an option to reboot in this scenario. Over time, it is likely to become full and force the reboot of the system. As a result, the user experience can be greatly degraded when a write filter is employed. Also, if the size of the overlay is set too high, the system may not have enough RAM left to run multiple applications or even the operating system.

U.S. patent application Ser. No. 15/422,012, titled "Mechanism To Free Up The Overlay Of A File-Based Write Filter" (the '012 Application) describes techniques for employing an overlay-managing write filter in conjunction with the write filter to monitor files that are stored in the overlay and move files that are not currently being accessed to thereby minimize the size of the overlay. If a request is made to access a moved file, the overlay-managing write filter can modify the request so that it targets the location of the moved file rather than the location of the original file on the protected volume. In this way, the fact that modified files are being moved from the overlay but not discarded can be hidden from the write filter. As a result, the effective size of the overlay will be increased while still allowing the write filter to function in a normal fashion.

Although these techniques are effective in reducing the size of the overlay, they can create various additional problems. For example, while the overlay-managing write filter is in the process of moving a file from the overlay, any process can attempt to open the file. If the overlay-managing write filter were to stop this attempt (e.g., by completing the I/O request with STATUS_RETRY as the NTSTATUS value in the IO_STATUS_BLOCK), it may create unpredictable behaviors. Also, for proper functioning, it is necessary that the overlay-managing write filter ensure that the latest copy of the file is opened. However, depending on the progress of the move, a copy in the overlay or a copy moved out of the overlay may be the latest copy.

Additionally, the overlay-managing write filter can only move a file from the overlay once all the handles to the file have been closed. If any process retains a handle to a file in the overlay, the overlay-managing write filter will not be able to move the file. Furthermore, even after an application closes, some handles to files the application opened may not be immediately closed due to the file system cache. The file system cache employs a "lazy writer" to periodically flush a portion of the cache to disk. Therefore, there will typically be an additional delay in freeing all handles to a file when an application closes. Furthermore, these lazy writers do not flush temporary files. As a result, handles to temporary files stored in the overlay may remain open indefinitely. For these reasons, the overlay-managing write filter may not be able to move files from the overlay in a timely manner which can result in the overlay becoming full. This is a significant problem in thin client environments since they have limited storage (whether RAM or disk) in which the overlay can grow.

To address this problem, some prior art solutions have lowered the threshold for warning the user when the overlay is becoming full (e.g., using the UWF SetWarningThreshold function). Such solutions are not desirable because they would require the user to manually close applications that they may be actively using. Also, as indicated above, closing the applications may be insufficient since the files may be retained in the file system cache until they are flushed to disk.

BRIEF SUMMARY

The present invention extends to methods, systems, and computer program products for accelerating the moving of files from an overlay and for atomically moving files from the overlay. Both techniques can be performed to enhance the performance of an overlay optimizer.

To accelerate the moving of files from the overlay, the overlay optimizer can continuously monitor the consumption of the overlay. If the consumption exceeds an optimized threshold, which is preferably much lower than the write filter's warning threshold, the overlay optimizer can cause the file system cache to be invalidated to thereby release handles to any closed files that are still cached. The overlay optimizer can then immediately move these files from the overlay. This can ensure that the size of the overlay does not exceed the overlay's warning or critical thresholds, or more importantly, that the overlay does not become full.

To move files atomically from the overlay, the overlay optimizer can be configured to handle attempts to open a file by determining whether the file is in the process of being moved from the overlay. If so, the overlay optimizer can detect which stage the move process has reached and can dynamically adapt the move process to enable the attempt to open the file to be completed successfully and in a consistent manner.

In one embodiment, the present invention can be implemented by an overlay optimizer as a method for accelerating the moving of files from an overlay of the write filter to an overlay cache. The overlay optimizer can monitor consumption of an overlay that a write filter employs to prevent contents of a protected volume from being modified and compare a current consumption of the overlay to an optimizer threshold. The overlay optimizer can then determine that the current consumption has reached the optimizer threshold. Upon determining that the current consumption has reached the optimizer threshold, the overlay optimizer can invalidate a file system cache that an operating system employs to cache files that are stored in the overlay. After invalidating the file system cache, which can cause all handles to one or more files to be closed, the overlay optimizer can move the one or more files from the overlay to an overlay cache.

In another embodiment, the present invention can be implemented by an overlay optimizer as a method for atomically moving files from an overlay to an overlay cache. The overlay optimizer can receive a file operation that targets a file stored on a volume that is protected by a write filter using an overlay and determine whether the targeted file is being moved from the overlay to an overlay cache. When it is determined that the targeted file is being moved from the overlay to the overlay cache, the overlay optimizer stops the process of moving the targeted file to the overlay cache and then allows the file operation to be passed to the write filter. When it is determined that the targeted file is not being moved from the overlay to the overlay cache and has not been copied to the overlay cache, the overlay optimizer allows the file operation to be passed to the write filter.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "artifact" should be construed as encompassing any element of a file system that can be modified via an I/O request. A "write filter" should be construed as encompassing the File-based Write Filter (FBWF) that is included in the Windows Embedded operating system, the Unified Write Filter (UWF) that is included in the Windows operating system, any equivalent write filter that may be provided in future releases of Windows, or any write filter that performs equivalent functionality in other operating systems (i.e., redirecting writes targeting a protected volume to a separate, and possibly temporary, storage location). A "protected volume" should be construed as a volume storing artifacts that a write filter protects from modification. The term "overlay optimizer" should be construed as including overlay-managing write filter 200 and, depending on the embodiment, including one or more of the other components that are described herein (e.g., copy component 200a, monitoring component 200b, etc.).

Figure 1:
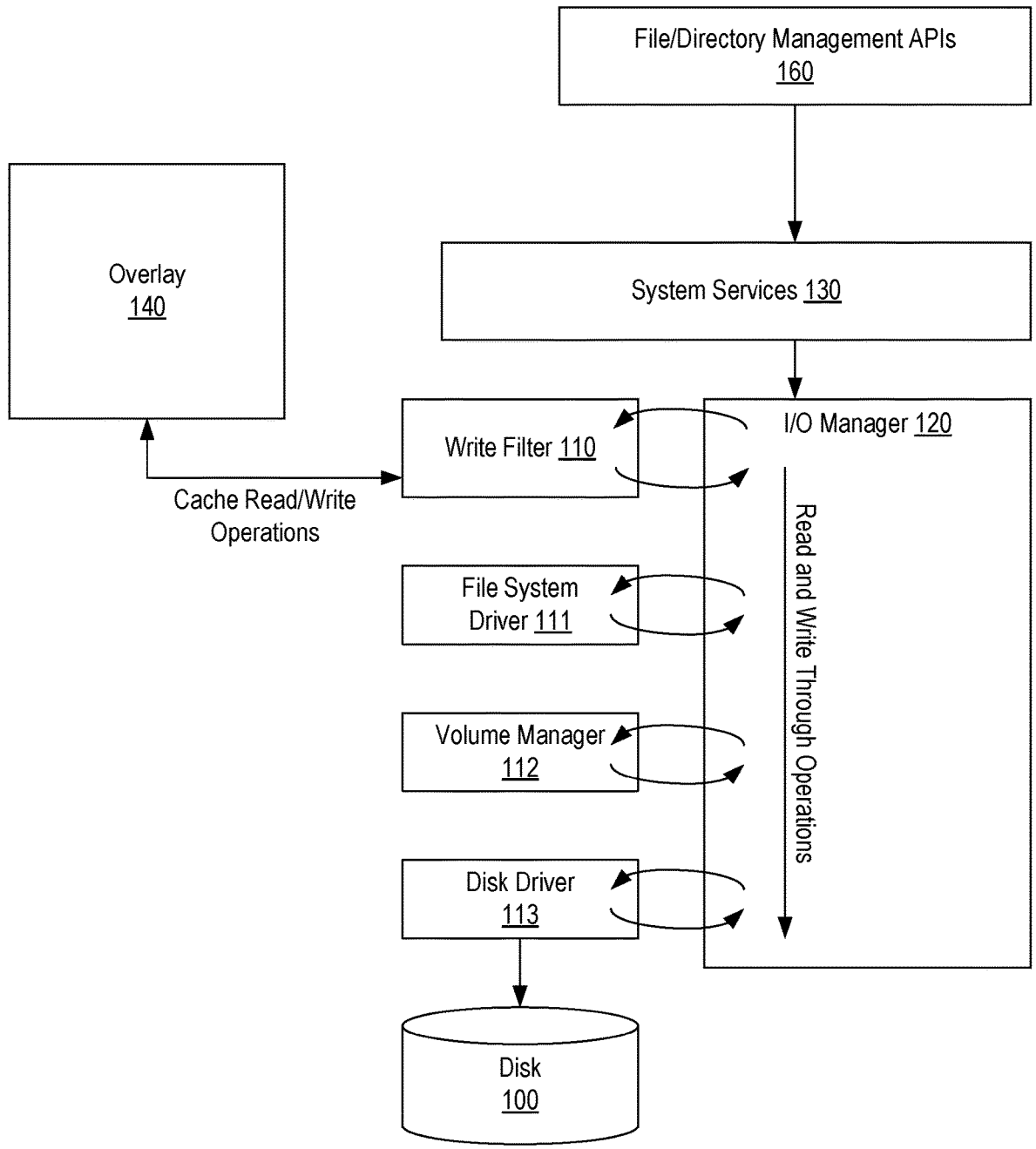
FIG. 1 illustrates a Windows-based I/O system in which a write filter is employed to redirect writes targeting a protected volume to an overlay.
Figure 2:
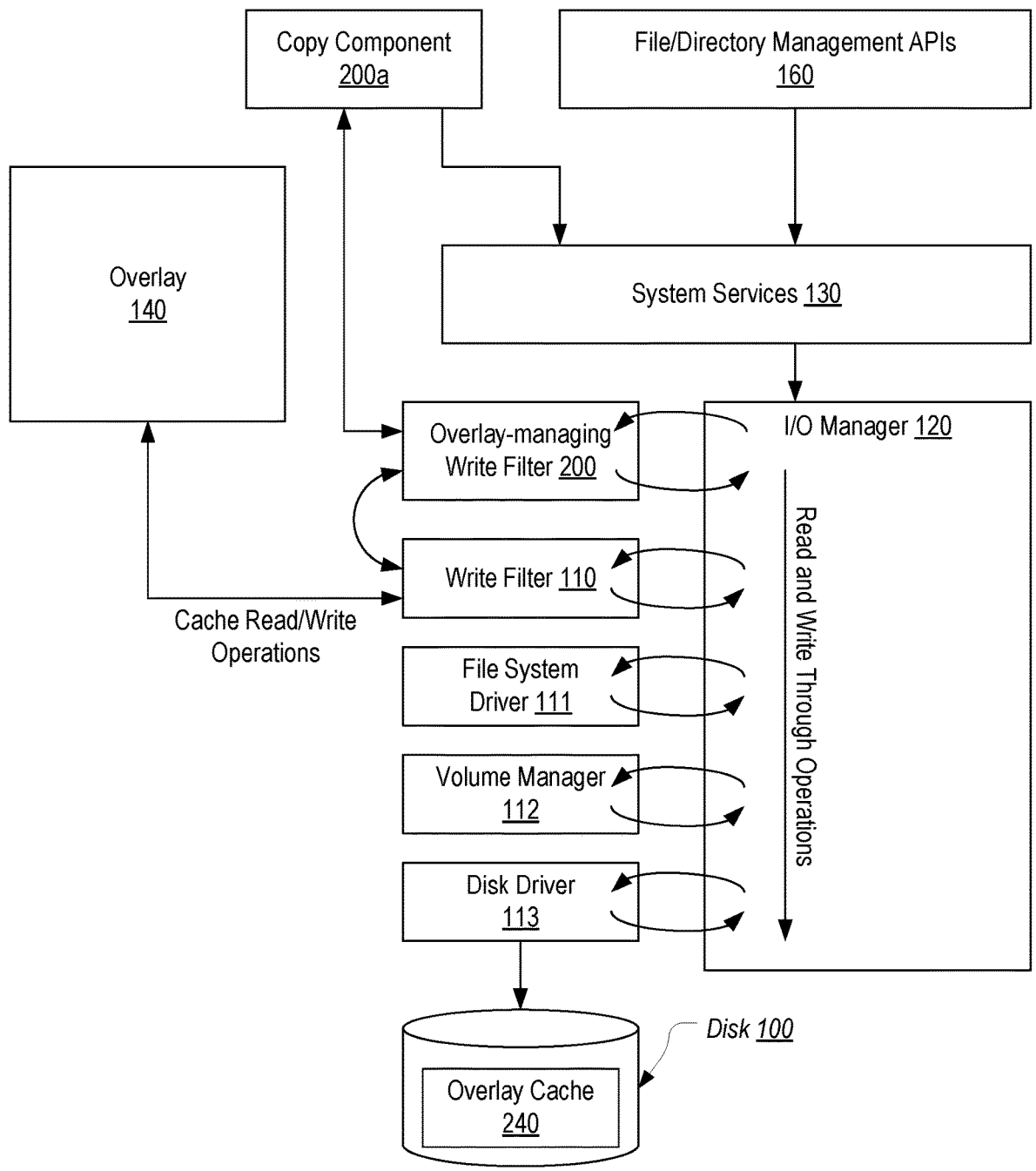
FIG. 2 illustrates how an overlay optimizer can be employed in conjunction with the write filter of FIG. 1 to free up the overlay.
Figure 3:
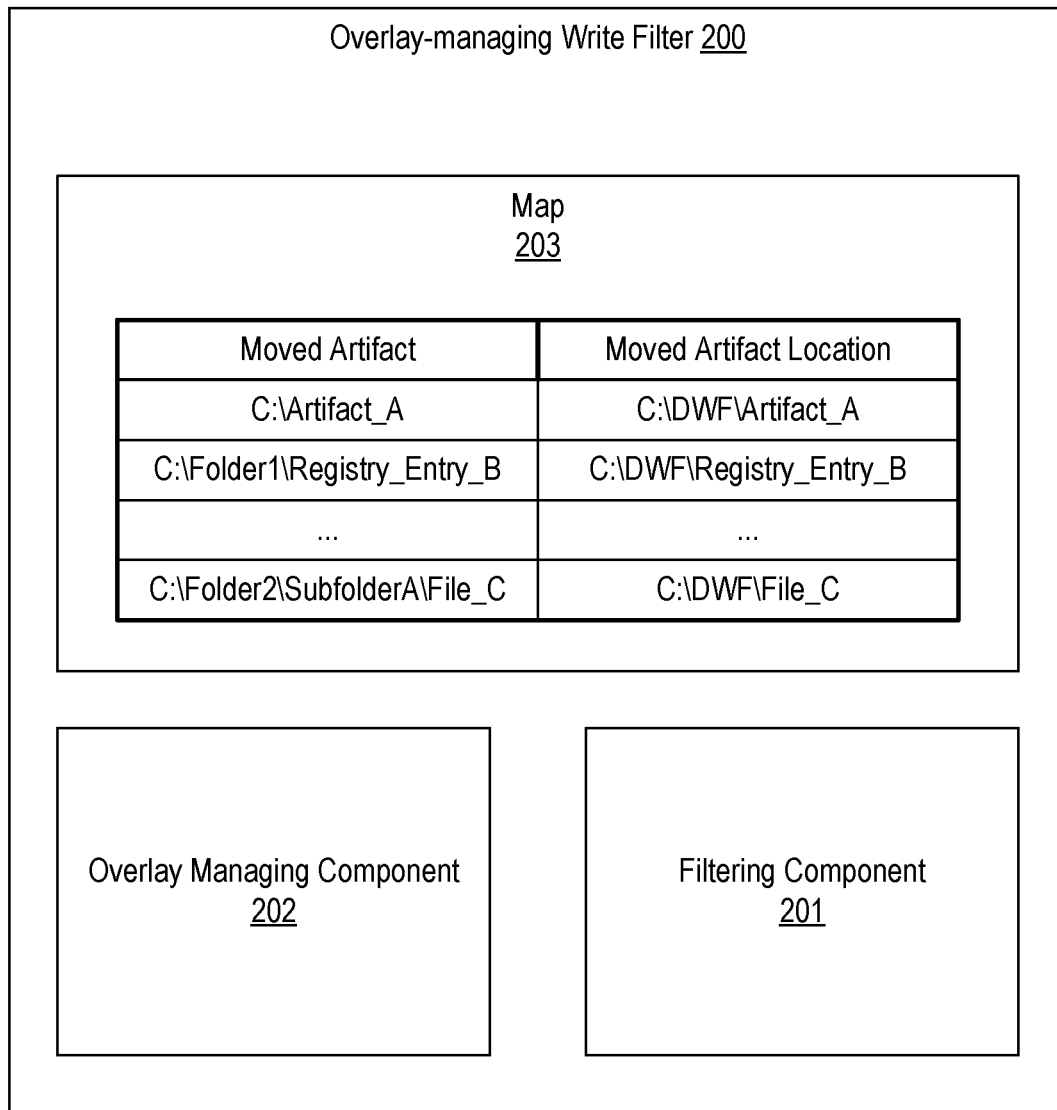
FIG. 3 illustrates various example components of an overlay-managing write filter.

FIGS. 2 and 3 and the following discussion is taken from the description of the '012 Application and is intended to provide an overview of one environment in which the present invention can be implemented. FIG. 2 is based on FIG. 1 and illustrates how an overlay-managing write filter 200 can be used in conjunction with write filter 110 to manage artifacts that are stored in overlay 140. More particularly, overlay-managing write filter 200 can monitor which artifacts in overlay 140 are not currently being accessed and can move them to an overlay cache 240 in the protected volume on disk 100. In some embodiments, this moving of artifacts can be carried out by employing a copy component 200a of overlay-managing write filter 200 that may preferably run in user mode. After moving an artifact to overlay cache 240, overlay-managing write filter 200 can cause the artifact to be discarded from overlay 140 thereby reducing the size of overlay 140 to prevent overlay 140 from becoming full. To ensure that the modifications that were made to the artifact are not lost, overlay-managing write filter 200 can monitor I/O requests to allow it to intercept a request to access an artifact that has been moved to overlay cache 240 and cause the request to be redirected to overlay cache 240. In this way, the fact that overlay-managing write filter 200 moves artifacts to overlay cache 240 will be hidden from write filter 110.

In some embodiments, overlay cache 240 can comprise a portion (e.g. one or more folders) of a protected volume that has been registered as an exclusion with write filter 110. In such cases, write filter 110 will not block overlay-managing write filter 200's write requests to overlay cache 240, or in other words, overlay-managing write filter 200 will be able to copy artifacts from overlay 140 to overlay cache 240. Although any suitable mechanism for moving an artifact from overlay 140 to overlay cache 240 may be employed, in some embodiments, overlay-managing write filter 200 may employ copy component 200a to perform a copy of the artifact in overlay 140 to overlay cache 240. The '012 Application includes a detailed example of how this copying process can be performed.

As represented by the arrow between the two filters, overlay-managing write filter 200 can be configured to employ functions of write filter 110 to accomplish various tasks such as identifying which artifacts in overlay 140 are not currently being accessed and instructing file-base write filter 110 to discard an artifact from overlay 140.

FIG. 3 provides an example of various components of overlay-managing write filter 200. As shown, overlay-managing write filter 200 can include a filtering component 201 and an overlay managing component 202. Filtering component 201 can generally represent the portion of overlay-managing write filter 200 that functions as a filter driver in the device stack for disk 100 (or, more specifically, in the stack for the protected volume). Accordingly, filtering component 201 can be configured to process IRPs that target artifacts on the protected volume. Importantly, because overlay-managing write filter 200 is positioned above write filter 110, filtering component 201 will be able to process these IRPs before they are handled by write filter 110.

Overlay managing component 202 can generally represent the portion of overlay-managing write filter 200 that is configured to interface with write filter 110 and possibly copy component 200a for the purpose of managing which artifacts are moved from overlay 140 to overlay cache 240 and for ensuring that subsequent requests to access a moved artifact can be handled in the proper manner (e.g., by identifying and modifying requests that target a moved artifact so that the moved artifact (which would be the modified version of the artifact) will be accessed from overlay cache 240 rather than from its permanent location on disk 100). The distinction between filtering component 201 and overlay managing component 202 is for illustrative purposes only and any suitable configuration of the functionality of overlay-managing write filter 200 may be employed. Also, a general reference to overlay-managing write filter 200 should be construed as including copy component 200a.

As shown in FIG. 3, overlay-managing write filter 200 can also maintain a map 203 which identifies which artifacts have been moved to overlay cache 240 as well as the specific location in overlay cache 240 where these moved artifacts are stored. Overlay managing component 202 can be configured to update and maintain map 203 based on which artifacts are moved to overlay cache 240. Overlay managing component 202 and/or filtering component 201 may also employ map 203 to properly redirect an I/O request that targets a moved artifact.

Accelerating the Moving of Files from the Overlay

As addressed in the background, overlay-managing write filter 200 cannot move a file from overlay 140 to overlay cache 240 in the manner described above until all handles to the file have been closed, and oftentimes, the operating system's file system cache delays the closing of handles. In accordance with embodiments of the present invention, an overlay optimizer can be configured to employ a monitoring component 200b that can function to detect when the size of the overlay has exceeded a threshold and can then cause the file system cache to be invalidated thereby accelerating the closing of all handles to a file stored in overlay 140. As a result, overlay-managing write filter 200 will be able to move the file from overlay 140 to overlay cache 240 sooner than would otherwise be possible. In this way, the overlay optimizer can reduce the likelihood that overlay 140's warning or critical threshold will be exceeded and prevent overlay 140 from becoming full.

Figure 4:
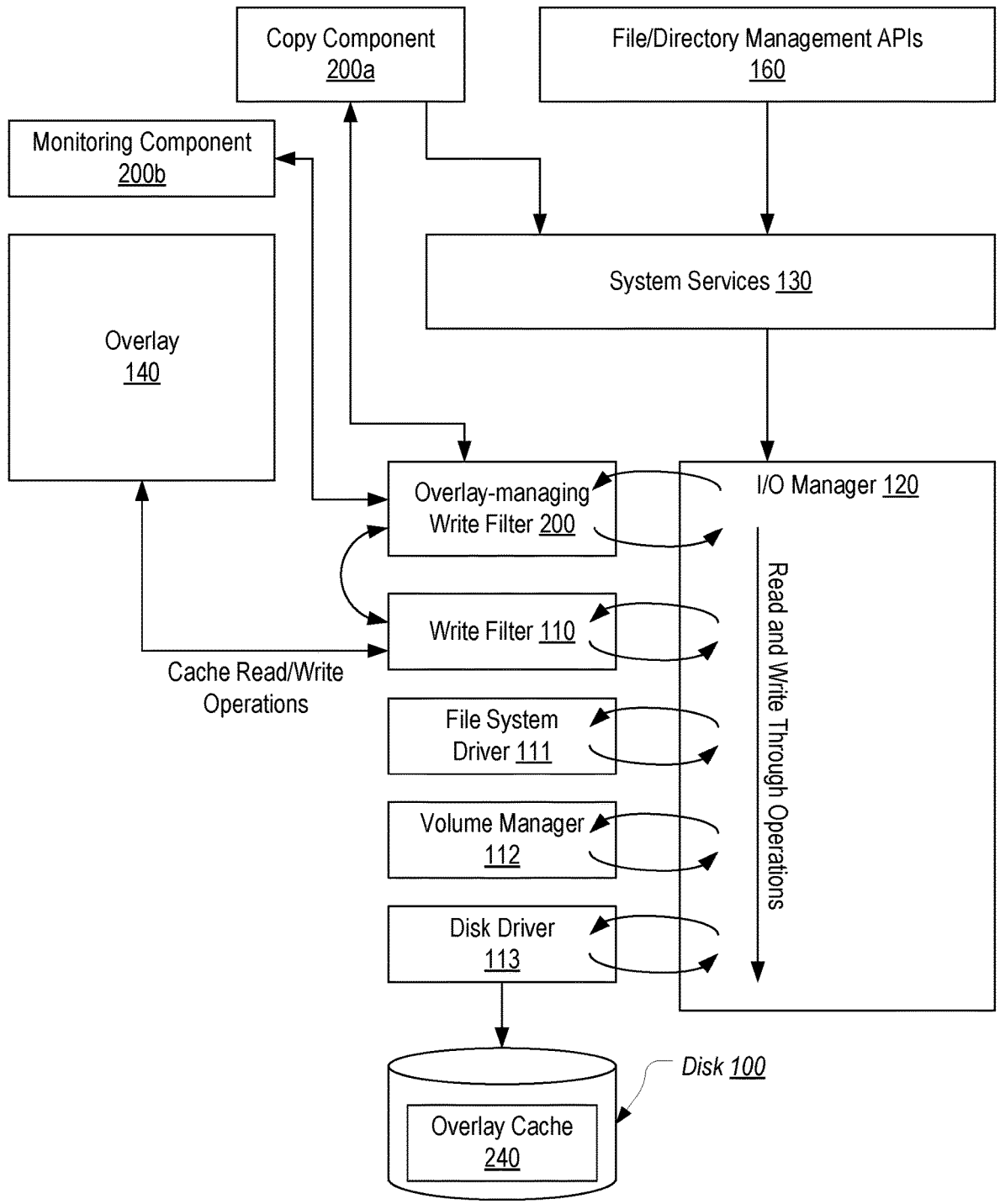
FIG. 4 illustrates how an overlay optimizer can include a monitoring component to accelerate the moving of files from the overlay to an overlay cache.
Figure 5:
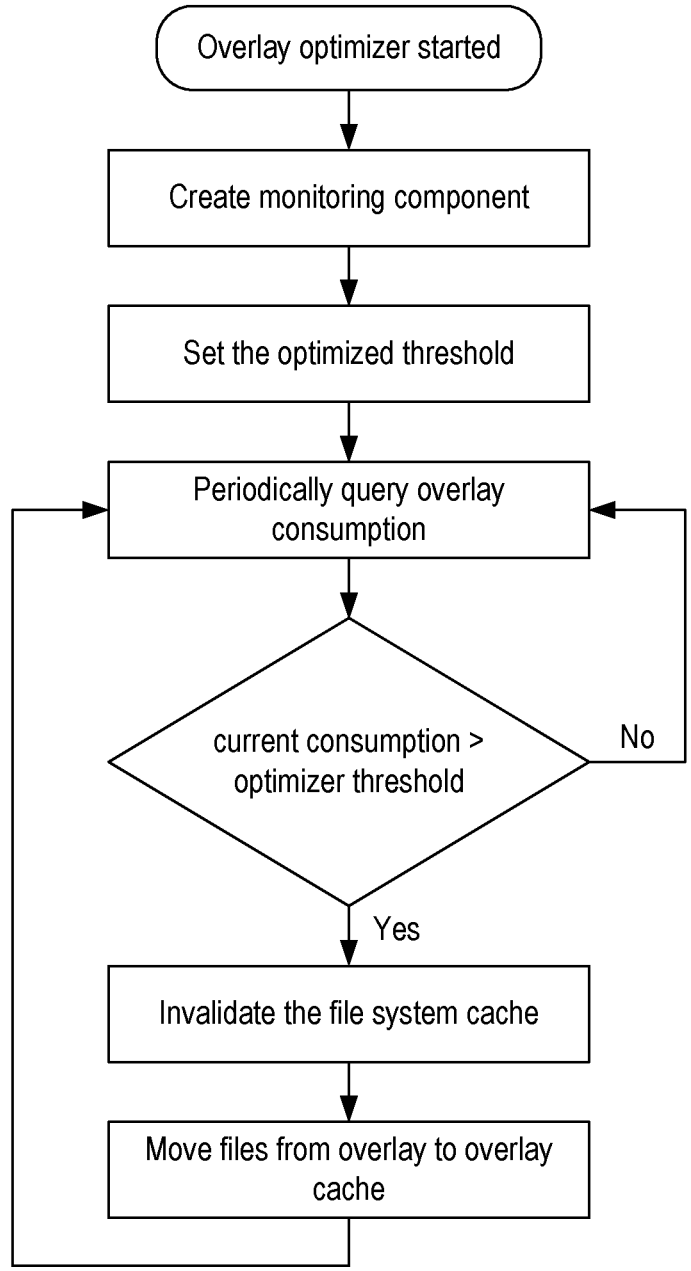
FIG. 5 illustrates a flow diagram depicting how the overlay optimizer can accelerate the moving of files from the overlay to the overlay cache.

FIG. 4 illustrates how the overlay optimizer can be configured to implement this acceleration of file moves. FIG. 4 is the same as FIG. 2 but with the addition of monitoring component 200b. Monitoring component 200b is a component of the overlay optimizer and works in conjunction with (or as part of) overlay-managing write filter 200 to perform the functionality represented in FIG. 5 and described below.

When the overlay optimizer is started, which typically will occur automatically when a user logs in to a computing device, the overlay optimizer can determine whether write filter 110 is enabled. If not, the overlay optimizer can stop since there will be no overlay to optimize during the session. In contrast, when write filter 110 is enabled, overlay-managing write filter 200 can be loaded above write filter 110, and monitoring component 200b can be created (e.g., as a separate user-mode thread). As part of creating monitoring component 200b, the overlay optimizer can set an optimizer threshold to be employed by monitoring component 200b when monitoring overlay 140. This optimizer threshold can be statically defined or can be dynamically calculated based on one or more of the currently defined maximum size, warning threshold or critical threshold of overlay 140, whether overlay 140 is a disk or RAM overlay, or any other characteristic or setting of overlay 140. Preferably, the optimizer threshold can be set to a value that is substantially lower than the warning threshold for reasons that will become apparent below.

Monitoring component 200b can be configured to monitor the consumption of overlay 140. In particular, monitoring component 200b can be configured to periodically query (e.g., every 5 seconds) the consumption of overlay 140. In some embodiments, this can be accomplished using the Get-Consumption or Get-AvailableSpace methods of the Windows UWF manager (uwfmgr.exe). In some embodiments, the rate at which monitoring component 200b is configured to query the consumption of overlay 140 may be dynamically set based on any of the same parameters referenced above. For example, monitoring component 200b may be configured to query more frequently as the consumption of overlay 140 increases.

Each time monitoring component 200b queries the consumption of overlay 140, it can compare the current consumption to the optimizer threshold. As an example, if the maximum size of overlay 140 is set to 100 MB and the overlay optimizer is configured to set the optimizer threshold to 50% of the maximum size, monitoring component 200b can determine whether the current consumption has exceeded 50 MB. Similarly, monitoring component 200b could be configured to define the optimizer threshold as a percentage and can therefore use the maximum size of overlay 140 to calculate the current percentage of consumption and then compare this current percentage to the optimizer threshold. In any case, monitoring component 200b can periodically perform this comparison to identify when the current consumption has exceeded the optimizer threshold.

If the current consumption has not yet reached the optimizer threshold, monitoring component 200b can simply wait until the next querying. However, if the current consumption has reached the optimizer threshold, monitoring component 200b can cause the file system cache to be invalidated which in turn will cause any handles to files that are no longer being accessed to be closed. This will allow overlay-managing write filter 200 to immediately move these files rather than having to wait until the cache manager causes the handles to be closed as part of its normal cache management techniques.

Monitoring component 200b (or optimizer module generally) can cause the file system cache to be invalidated in a number of ways including: (1) limiting the file system cache maximum size; (2) purging the standby list of the file system cache; and (3) opening a handle to the root-volume. Monitoring component 200b can be configured to implement any or all of these techniques to accelerate the moving of files to overlay cache 240. Each of these techniques for causing the file system cache to be invalidated will be described in detail as follows.

Monitoring component 200b can limit the file system cache maximum size to attempt to cause the cache manager to flush the portion of the cache containing a file in overlay 140 more quickly. For example, the cache manager is typically configured to flush data from the file system cache in a manner that optimizes performance. Monitoring component 200b can leverage this functionality by incrementally/iteratively reducing the maximum size of the file system cache. As the maximum size is reduced, the cache manager should cause the least recently accessed pages in the file system cache to be flushed/freed more quickly.

In some embodiments, monitoring component 200b can limit the file system cache maximum size by first obtaining the current maximum size and then reducing it by a specified increment. This can be accomplished by calling the GetSystemFileCacheSize function to obtain the current maximum size, decrementing the current maximum size by some amount, and then calling the SetSystemFileCacheSize function with the reduced maximum size as the value of the MaximumFileCacheSize parameter. As the cache manager flushes pages to disk, the handles to any files that are no longer being accessed will be closed thereby allowing overlay-managing write filter 200 to move those files to overlay cache 240.

Monitoring component 200b can iteratively reduce the maximum size until the reduction has caused sufficient handles to be closed to allow overlay-optimizer write filter 200 to move files from overlay 140. In some embodiments, monitoring component 200b can continue to reduce the maximum size in increments until overlay-optimizer write filter 200 has reduced the consumption of overlay 140 below some threshold. At that point, monitoring component 200b could be configured to return the maximum size of the file system cache to its original value so that system performance is not degraded. Alternatively, monitoring component 200b could retain the maximum size of the file system cache at some reduced value to cause the cache manager to free pages more quickly on an ongoing basis.

Similar to limiting the maximum size of the file system cache, monitoring component 200b can purge the standby list of the file system cache to attempt to cause pages containing files stored in overlay 140 to be flushed from the file system cache. The file system cache uses the standby list to store pages that are associated with a running process but are not part of that process's working set (e.g., pages that the process has not recently accessed). This enables the page to be immediately moved back to the process's working set while also enabling the page to be quickly freed for another process.

The standby list may therefore retain open handles to files stored in overlay 140 even though those files may have been closed by the process. Accordingly, when monitoring component 200b determines that the current consumption of overlay 140 has reached the optimizer threshold, it can force the cache manager to flush the pages in the standby list to disk. In some embodiments, this can be accomplished using the ZwSetSystemInformation function and specifying SystemMemoryListInformation as the value of the SystemInformationClass parameter and MemoryPurgeStandbyList as the value of the SystemInformation parameter. This will cause any "dormant" handles to be closed thereby enabling overlay-managing write filter 200 to move the corresponding files to overlay cache 240.

Finally, monitoring component 200b can open a handle to the root volume where overlay 140 is stored. For example, assuming overlay 140 exists at C:\overlay, monitoring component can call the CreateFile function and specify "\\.\C:" as the value for the lpFileName string which will return a handle to the C: volume. Opening a handle to the root volume of overlay 140 will cause any contents of that volume that are cached in the file system cache, including files that are stored in overlay 140, to be flushed to disk. This will therefore close any handles to files that are no longer being accessed.

Regardless of which technique monitoring component 200b employs to invalidate the file system cache, after invalidating the file system cache, overlay-managing write filter 200 can move, to overlay cache 240, any files for which no open handles remain. As can be seen, the file system cache, which is intended to optimize the system, can in fact degrade its performance when the write filter is enabled. The overlay optimizer, via monitoring component 200b, works synergistically with the file system cache to further optimize the system when the write filter is enabled.

Figure 6:
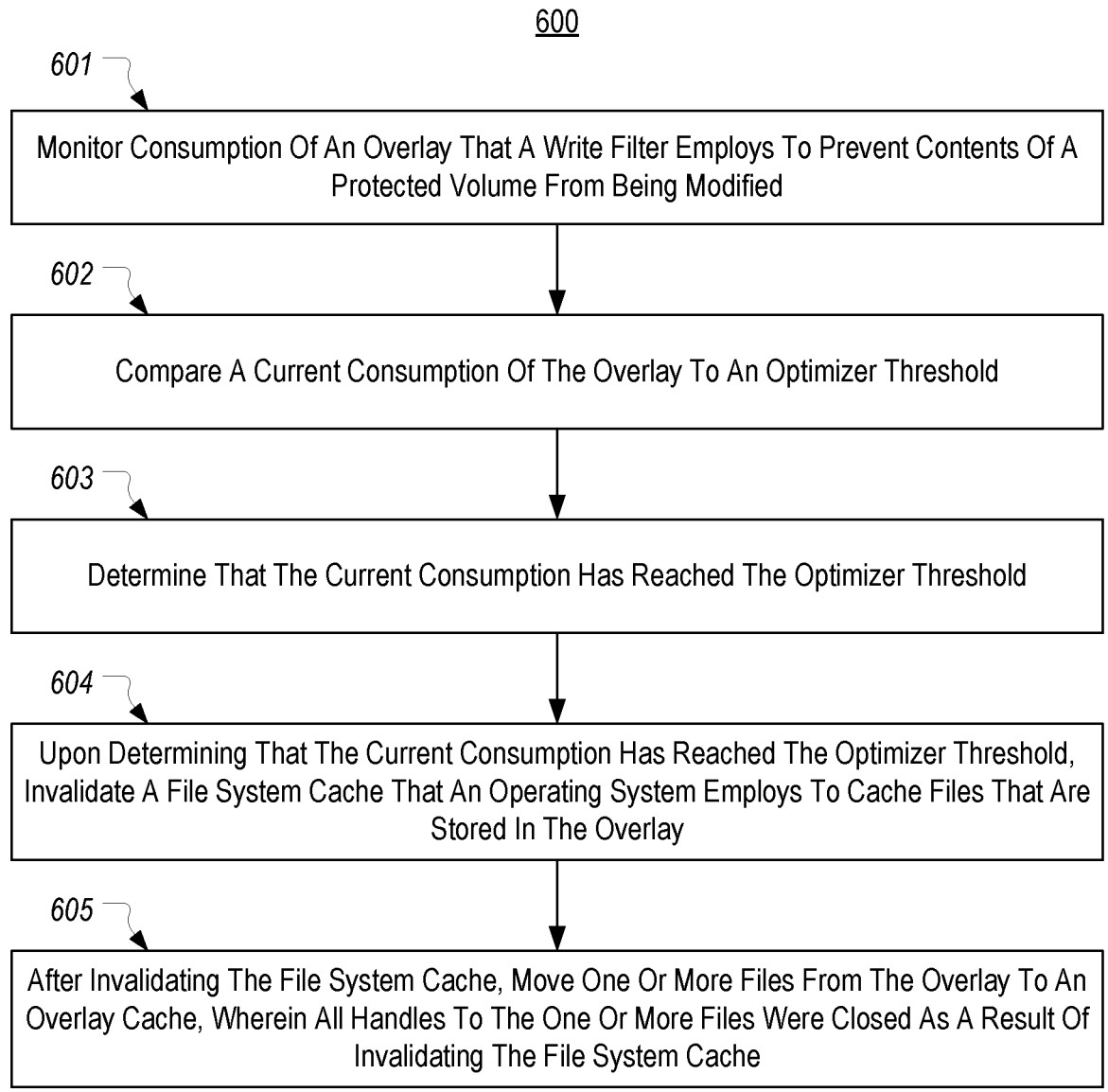
FIG. 6 illustrates a flowchart of a method for accelerating the moving of files from the overlay to the overlay cache.

FIG. 6 provide a flowchart of an example method 600 for accelerating the moving of files from an overlay of the write filter to an overlay cache. Method 600 can be performed by monitoring component 200b and overly-managing write filter 200.

Method 600 includes an act 601 of monitoring consumption of an overlay that a write filter employs to prevent contents of a protected volume from being modified. For example, monitoring component 200b can monitor the consumption of overlay 140 which may be stored in RAM or on disk.

Method 600 includes an act 602 of comparing a current consumption of the overlay to an optimizer threshold. For example, monitoring component 200b can compare the current consumption of overlay 140 to an optimizer threshold that was defined based on one or more characteristics of overlay 140 and/or on other factors.

Method 600 includes an act 603 of determining that the current consumption has reached the optimizer threshold. For example, monitoring component 200b can determine that the current consumption of overlay 140 has reached the defined optimizer threshold.

Method 600 includes an act 604 of, upon determining that the current consumption has reached the optimizer threshold, invalidating a file system cache that an operating system employs to cache files that are stored in the overlay. For example, monitoring component 200b, or another component of the overlay optimizer, can cause the file system cache for the volume on which overlay 140 is stored to be invalidated.

Method 600 includes an act 605 of, after invalidating the file system cache, moving one or more files from the overlay to an overlay cache, wherein all handles to the one or more files were closed as a result of invalidating the file system cache. For example, overlay-managing write filter 200 can move one or more files from overlay 140 to overlay cache 240.

In summary, by detecting when overlay 140's consumption has reached the optimizer threshold, monitoring component 200b can selectively accelerate when all handles to files stored in overlay 140 will be closed. This in turn will enable overlay-optimizing write filter 200 to move files from overlay 140 sooner thereby preventing, or at least delaying, the consumption of overlay 140 from reaching the warning or critical threshold.

Atomically Moving Files from the Overlay

As addressed in the background, while the overlay optimizer is in the process of moving a file from overlay 140 to overlay cache 240, another process may attempt to open the file (e.g., to read, modify, and/or delete the file). To eliminate unpredictable behavior in such cases, overlay-optimizing write filter 200 can be configured to perform a process to move the file atomically.

Figure 7:
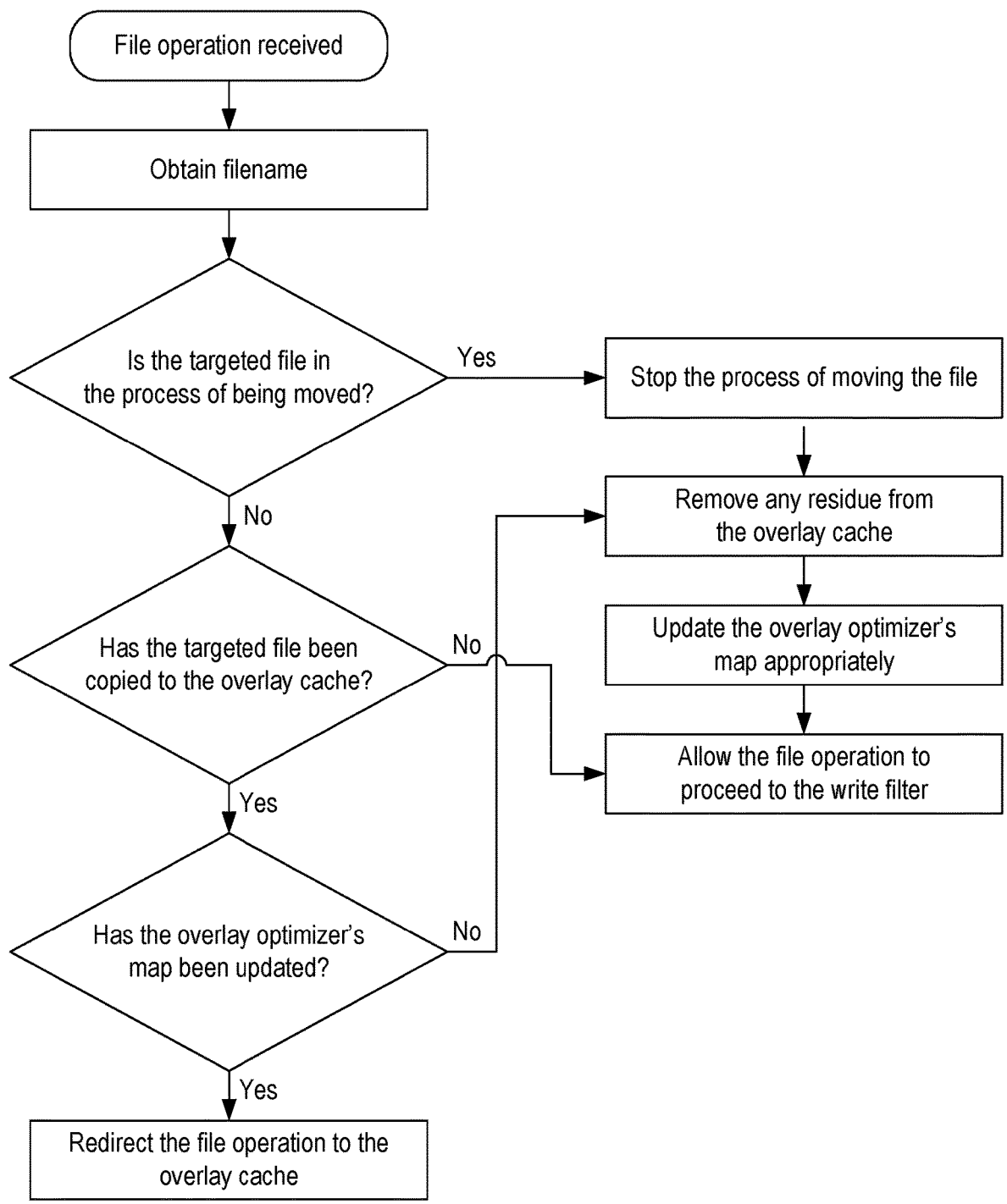
FIG. 7 illustrates a flow diagram depicting how the overlay optimizer can atomically move files from the overlay to the overlay cache.

FIG. 7 illustrates how overlay-managing write filter 200 can implement a process for atomically moving files from overlay 140 to overlay cache 240. Overlay-managing write filter 200 can perform this process in response to receiving a file operation that is being passed down the file system stack. For example, this process can be implemented within overlay-managing write filter 200's preoperation callback routine for IRP_MJ_CREATE IRPs.

Upon receiving a file operation, overlay-managing write filter 200 can obtain the filename of the targeted file (e.g., from the DeviceObject parameter of the IRP_MJ_CREATE request) and then use this filename to determine whether the targeted file is in the process of being moved from overlay 140 to overlay cache 240. In this context, a file is in the process of being moved if overlay-managing write filter 200 has initiated I/O requests to copy the file to overlay cache 240 but these I/O requests have not yet been completed.

If overlay-managing write filter 200 is in the process of moving the targeted file to overlay cache 240, it can stop the process. For example, overlay-managing write filter 200 can cancel any IRPs that it has initiated to cause the targeted file to be created in overlay cache 240. Depending on how far this copy process has proceeded, in addition to stopping the process, overlay-managing write filter 200 can also remove any residue from overlay cache 240. For example, if the process has caused a file to be created on overlay cache 240 (but not fully updated/populated to match the targeted file that exists in overlay 140), overlay-managing write filter 200 can delete the file. Depending again on how far the process has proceeded, overlay-managing write filter 200 may also update map 203 to remove and/or update any entries that may have been affected by the now-cancelled move. For example, map 203 could include a listing of files that are being copied in addition to files that have been copied. In this scenario, the "being copied" entry could be removed. Finally, overlay-managing write filter 200 can allow the file operation to proceed to write filter 110 for normal handling. In this scenario, the targeted file will exist in overlay 140 (otherwise, overlay-managing write filter 200 would not have been attempting to move it to overlay cache 240), and therefore, normal handling will entail redirecting the file operation to overlay 140.

If overlay-managing write filter 200 is not in the process of moving the targeted file to overlay cache 240, it can then determine whether the targeted file has been copied to overlay cache 240. If not, which could imply that the targeted file is not stored in overlay 140 or that the targeted file is stored in overlay 140 but overlay-managing write filter 200 has not yet attempted to move it to overlay cache 240, overlay-managing write filter 200 can allow the file operation to proceed to write filter 110 for normal handling.

However, if the targeted file has been copied to overlay cache 240, which would imply that overlay-managing write filter 200 initiated a process of copying the targeted file and this process has completed, overlay-managing write filter 200 can then determine whether map 203 has been updated appropriately. This last determination is intended to catch instances where map 203 may not yet accurately reflect the state of overlay cache 240. In instances where the targeted file has been copied to overlay cache 240 but map 203 has not yet been updated, overlay-managing write filter 200 can remove the residue from overlay cache 240 (e.g., by deleting the file that was copied to overlay cache 240), update map 203 if necessary (e.g., by deleting any entry that identifies that the targeted file is being copied), and then allow the file operation to proceed to write filter 110. In contrast, if map 203 has been updated to reflect that the targeted file has been copied to overlay cache 240, which implies that overlay-managing write filter 200 completed the full process of moving the file to overlay cache 240, overlay-managing write filter 200 will redirect the file operation to overlay cache 240 rather than allowing write filter 110 to redirect it to overlay 140.

To enable this process to be performed, overlay-managing write filter 200 will delete a file from overlay 140 only after it has successfully created a copy of the file in overlay cache 240 and updated map 203 appropriately. This will ensure that the process shown in FIG. 7 will always cause the file operation to be directed to the current/modified version of the targeted file.

Figure 8:
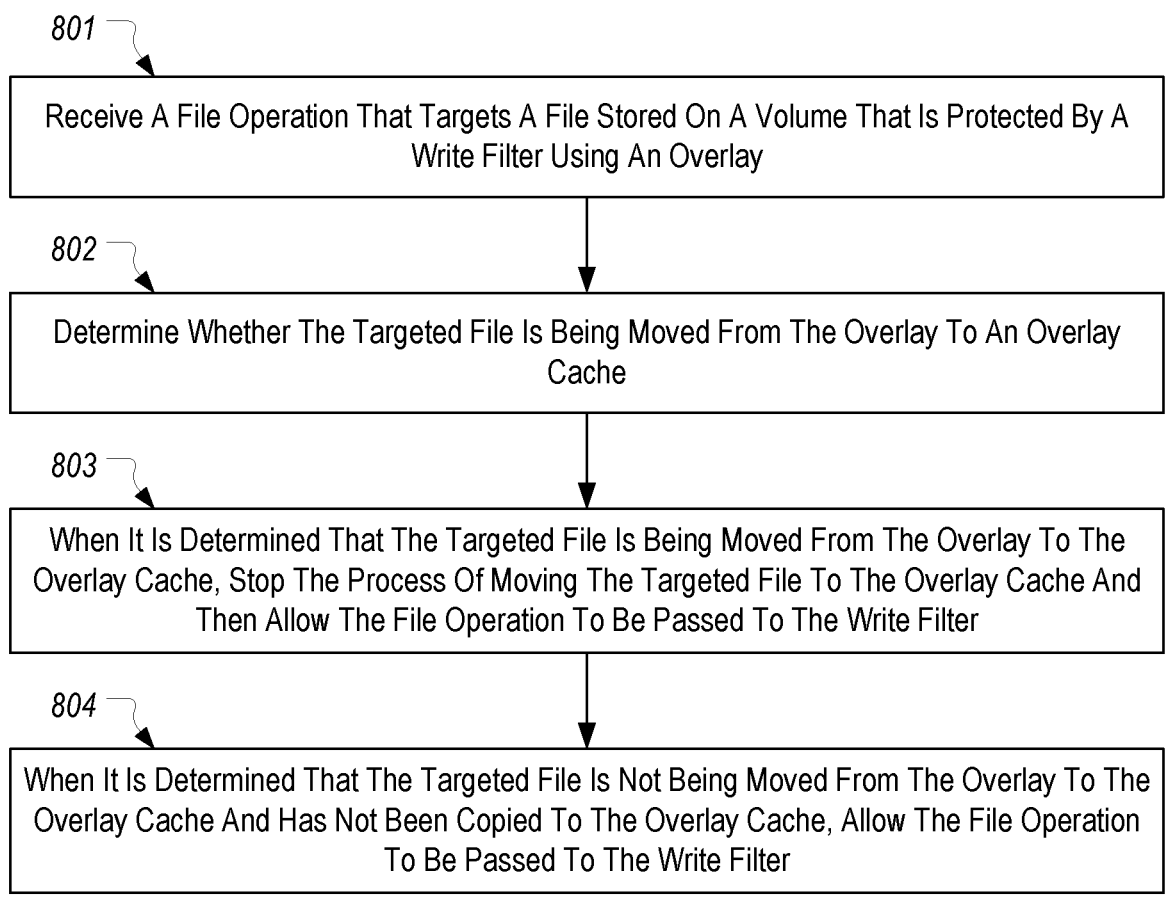
FIG. 8 illustrates a flowchart of a method for atomically moving files from the overlay to the overlay cache.

FIG. 8 provide a flowchart of an example method 800 for atomically moving files from an overlay to an overlay cache. Method 800 can be performed by overly-managing write filter 200.

Method 800 includes an act 801 of receiving a file operation that targets a file stored on a volume that is protected by a write filter using an overlay. For example, overly-managing write filter 200 can be passed a file operation that targets a file stored on a volume protected by write filter 110.

Method 800 includes an act 802 of determining whether the targeted file is being moved from the overlay to an overlay cache. For example, overly-managing write filter 200 can determine whether it has initiated a process of moving a file in overlay 140 to overlay cache 240.

Method 800 includes an act 803 of, when it is determined that the targeted file is being moved from the overlay to the overlay cache, stopping the process of moving the targeted file to the overlay cache and then allowing the file operation to be passed to the write filter. For example, overly-managing write filter 200 can cancel any IRPs that were initiated to cause a file to be moved from overlay 140 to overlay cache 240 and then allow the file operation to be passed down to write filter 110.

Method 800 includes an act 804 of, when it is determined that the targeted file is not being moved from the overlay to the overlay cache and has not been copied to the overlay cache, allowing the file operation to be passed to the write filter. For example, overly-managing write filter 200 can pass the file operation down to write filter 110.

In summary, overlay-managing write filter 200 can be configured to dynamically adapt the handling of a move process in response to a file operation that targets the file being moved. In this way, overlay-managing write filter 200 can ensure that file operations targeting files that have been modified will be handled consistently and predictably.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an overlay optimizer, for accelerating moving files from an overlay of the write filter to an overlay cache, the method comprising:
    monitoring consumption of an overlay that a write filter employs to prevent contents of a protected volume from being modified;
    comparing a current consumption of the overlay to an optimizer threshold;
    determining that the current consumption has reached the optimizer threshold;
    upon determining that the current consumption has reached the optimizer threshold, invalidating a file system cache that an operating system employs to cache files that are stored in the overlay; and
    after invalidating the file system cache, moving one or more files from the overlay to an overlay cache, wherein all handles to the one or more files were closed as a result of invalidating the file system cache.

2. The method of claim 1, further comprising:
    defining the optimizer threshold based on a maximum size of the overlay.

3. The method of claim 1, further comprising:
    defining the optimizer threshold based on one or both of a warning threshold or a critical threshold of the overlay.

4. The method of claim 1, wherein monitoring consumption of the overlay comprises periodically calling a function that returns the current consumption of the overlay.

5. The method of claim 1, wherein invalidating the file system cache comprises reducing a maximum size of the file system cache.

6. The method of claim 5, wherein reducing the maximum size of the file system cache comprises reducing the maximum size multiple times.

7. The method of claim 1, wherein invalidating the file system cache comprises purging a standby list of the file system cache.

8. The method of claim 1, wherein invalidating the file system cache comprises opening a handle to a root volume where the overlay is stored.

9. One or more computer storage media storing computer-executable instructions which when executed by one or more processors implement an overlay optimizer that is configured to perform the following:
    monitor consumption of an overlay that a write filter employs to prevent contents of a protected volume from being modified;
    compare a current consumption of the overlay to an optimizer threshold;
    determine that the current consumption has reached the optimizer threshold;
    upon determining that the current consumption has reached the optimizer threshold, invalidate a file system cache that an operating system employs to cache files that are stored in the overlay;
    after invalidating the file system cache, move one or more files from the overlay to an overlay cache, wherein all handles to the one or more files were closed as a result of invalidating the file system cache;
    receive a file operation that targets a file stored on the protected volume;
    determine whether the targeted file is being moved from the overlay to the overlay cache;
    when it is determined that the targeted file is being moved from the overlay to the overlay cache, stop the process of moving the targeted file to the overlay cache and then allow the file operation to be passed to the write filter; and when it is determined that the targeted file is not being moved from the overlay to the overlay cache and has not been copied to the overlay cache, allow the file operation to be passed to the write filter.

10. The computer storage media of claim 9, wherein the targeted file is one of the one or more files moved after invalidating the file system cache.

11. The computer storage media of claim 9, wherein invalidating the file system cache comprises one or more of:

reducing a maximum size of the file system cache;

purging a standby list of the file system cache; or opening a handle to a root volume where the overlay is stored.

12. The computer storage media of claim 9, wherein the overlay optimizer is further configured to perform the following:

when it is determined that the targeted file is not being moved from the overlay to the overlay cache but has been copied to the overlay cache, determining whether a map, which defines contents of the overlay cache, has been updated to reflect that the targeted file has been copied to the overlay cache;

when it is determined that the map has been updated to reflect that the targeted file has been copied to the overlay cache, redirecting the file operation to cause the copy of the targeted file in the overlay cache to be accessed; and when it is determined that the map has not been updated to reflect that the targeted file has been copied to the overlay cache, removing the copy of the targeted file from the overlay cache and allowing the file operation to be passed to the write filter.

13. The computer storage media of claim 12, wherein, when it is determined that the map has not been updated to reflect that the targeted file has been copied to the overlay cache, the overlay optimizer also removes an entry from the map that reflects that the targeted file is being moved.

* * * * *